United States Patent [19]

Hihara et al.

[11] Patent Number: 4,888,028
[45] Date of Patent: Dec. 19, 1989

[54] WATER-SOLUBLE BLUE DYE MIXTURE AND DYEING METHOD: ANTHRAQUINONE REACTIVE DYE AND FORMAZAN REACTIVE DYE

[75] Inventors: Toshio Hihara; Riyouichi Sekioka, both of Kitakyushu, Japan

[73] Assignee: Mitsubishi Kasei Corporation, Tokyo, Japan

[21] Appl. No.: 206,727

[22] Filed: Jun. 15, 1988

[30] Foreign Application Priority Data

Jul. 22, 1987 [JP] Japan .................... 62-183119

[51] Int. Cl.$^4$ .................... C09B 67/22; D06P 1/38
[52] U.S. Cl. .................... 8/549; 8/543; 8/639; 8/643; 8/676; 8/679; 8/688; 8/917; 8/918; 8/924
[58] Field of Search .................... 8/549, 639, 643

[56] References Cited

U.S. PATENT DOCUMENTS

| | | | |
|---|---|---|---|
| 4,088,441 | 5/1978 | Meininger et al. | 8/549 |
| 4,283,195 | 8/1981 | Nakatsuka et al. | 8/524 |
| 4,349,349 | 9/1982 | Nakatsuka et al. | 8/527 |
| 4,589,885 | 5/1986 | Opitz | 8/527 |
| 4,720,542 | 1/1988 | Omura et al. | 534/618 |
| 4,872,881 | 10/1989 | Fujita | 8/549 |

FOREIGN PATENT DOCUMENTS

| | | |
|---|---|---|
| 21351 | 1/1981 | European Pat. Off. . |
| 76782 | 4/1983 | European Pat. Off. . |
| 99721 | 2/1984 | European Pat. Off. . |
| 63/168465 | 7/1988 | Japan . |
| 8805065 | 7/1988 | PCT Int'l Appl. . |
| 8900184 | 1/1989 | PCT Int'l Appl. . |

*Primary Examiner*—A. Lionel Clingman
*Attorney, Agent, or Firm*—Oblon, Spivak, McClelland, Maier & Neustadt

[57] ABSTRACT

A water-soluble dye mixture comprising a blue anthraquinone reactive dye represented in its free acid form by the formula:

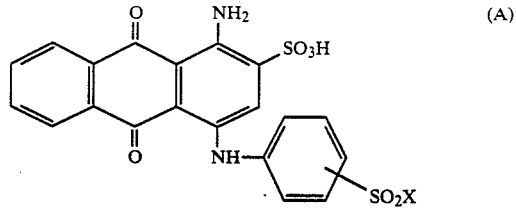

wherein X is —CH=CH$_2$ or —C$_2$H$_4$W wherein W is a group removable by action of alkali and from 0.2 to 5 times by weight to said anthraquinone reactive dye of a blue formazan reactive dye represented in its free acid form by the formula:

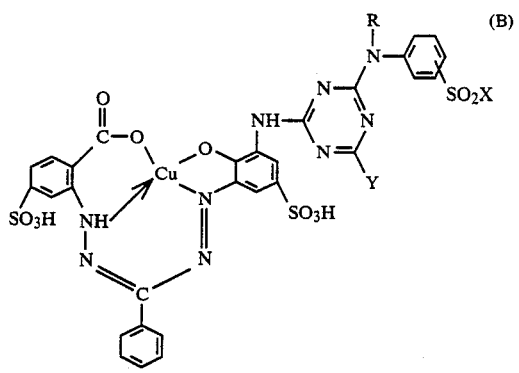

wherein R is a hydrogen atom or a C$_1$-C$_4$ alkyl group, Y is a halogen atom, —NHC$_2$H$_4$SO$_3$H or .

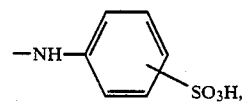

and X is —CH=CH$_2$ or —C$_2$H$_4$W wherein W is a group removable by action of alkali.

12 Claims, No Drawings

WATER-SOLUBLE BLUE DYE MIXTURE AND DYEING METHOD: ANTHRAQUINONE REACTIVE DYE AND FORMAZAN REACTIVE DYE

The present invention relates to a water-soluble dye mixture and a dyeing method employing the dye mixture. Particularly, it relates to a clear blue reactive dye mixture capable of dyeing satisfactorily even at a low salt concentration and having excellent build up properties and a dyeing method employing such a mixture.

Water-soluble reactive dyes for dyeing cellulose-containing fibers are required to be excellent in various dyeing properties. In the case of blue dyes, anthraquinone dyes are generally known to be clear and excellent in build up properties. However, when an anthraquinone dye is used for dyeing, it is usually required to maintain the salt concentration in the dye bath at a relatively high level, and there has been an additional problem that the dyeing properties vary depending upon the dyeing temperature.

In order to lessen such problems of anthraquinone dyes, it is conceivable to use them in combination with other type of dyes which are excellent in the temperature dependency at the time of dyeing and which are capable of dyeing satisfactorily at a low salt concentration. However, if other types of dyes are mixed with anthraquinone dyes, the excellent properties of anthraquinone dyes such as clearness and build up properties tend to deteriorate although the above problems may be lessened. From the practical point of view, the clearness may be sacrificed to some extent, but it is untenable to sacrifice the build up properties, since the merit of using anthraquinone dyes will thereby be lost.

Under these circumstances, the present inventors have conducted extensive researches with an object to obtain a dye mixture whereby the temperature dependency is improved without impairing the excellent build up properties of an anthraquinone dye and which is capable of dyeing satisfactorily at a low salt concentration. As a result, it has been found possible to accomplish the object by incorporating a predetermined amount of a formazan dye having a certain specific structure to an anthraquinone dye having a certain specific structure. The present invention has been accomplished on the basis of this discovery.

The present invention provides a water-soluble dye mixture comprising a blue anthraquinone reactive dye represented in its free acid form by the formula:

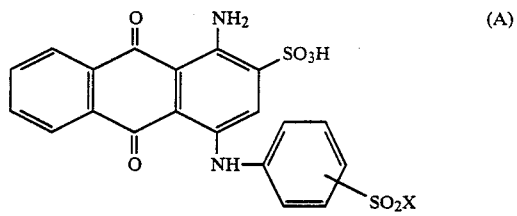

wherein X is —CH=CH$_2$ or —C$_2$H$_4$W wherein W is a group removable by action of alkali and from 0.2 to 5 times by weight to said anthraquinone reactive dye of a blue formazan reactive dye represented in its free acid form by the formula:

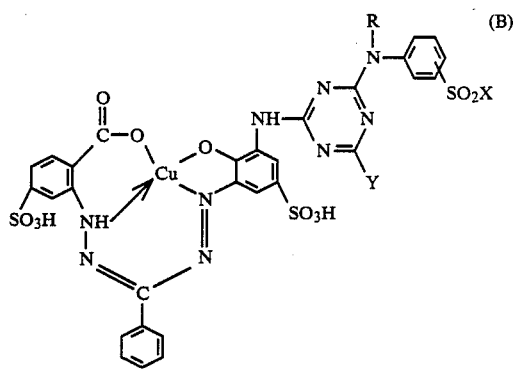

wherein R is a hydrogen atom or a C$_1$–C$_4$ alkyl group, Y is a halogen atom, —NHC$_2$H$_4$SO$_3$H or

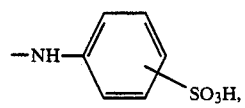

and X is —CH=CH$_2$ or —C$_2$H$_4$W wherein W is a group removable by action of alkali.

Further, the present invention provides a dyeing method wherein the above water-soluble dye mixture is employed.

Now, the present invention will be described in detail with reference to the preferred embodiments.

The dye represented by the formula (A) is known as C.I. Reactive Blue 19. Whereas, the dye represented by the formula (B) is disclosed either specifically or by a general formula in Japanese Unexamined Patent Publication No. 15451/1984 or Japanese Examined Patent Publication No. 18357/1985 or No. 17457/1985. For example, Japanese Unexamined Patent Publication No. 15451/1984 discloses a dye represented in its free acid form by the formula:

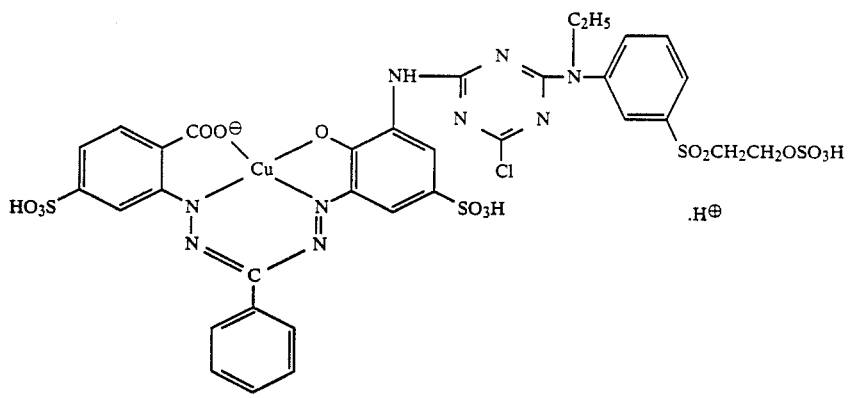

Likewise, Japanese Examined Patent Publication No. 18357/1985 discloses a dye represented by the formula:

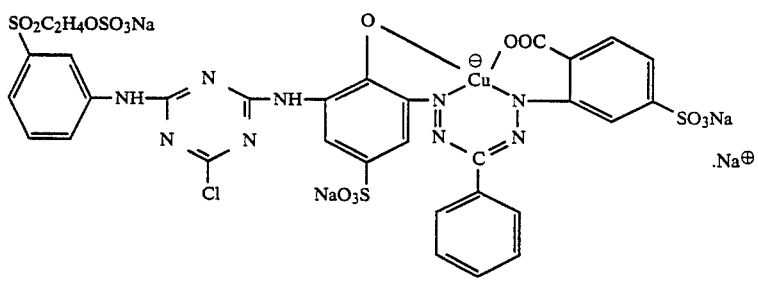

The present invention is characterized in that among various known blue reactive dyes, the specific anthraquinone reactive dye of the formula (A) and the specific copper formazan reactive dye of the formula (B) are combined.

In the formulas (A) and (B) in the present invention, the group of W removable by action of alkali may usually be $-OSO_3H$, $-SSO_3H$, $-OPO_3H_2$, $-OCOCH_3$ or a halogen atom. Among them, $-OSO_3H$ is most typical.

The $C_1$-$C_4$ alkyl group for R includes a methyl group, an ethyl group, a n-propyl group, an i-propyl group and a n-butyl group.

Y is a halogen atom, $-NHC_2H_4SO_3H$ or

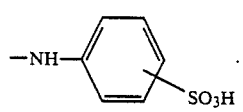

Among them, the halogen atom or $-NHC_2H_4SO_3H$ is preferred.

In the above formulas (A) and (B), the group of the formula $-SO_2X$ is preferably attached to the p- or m-position to the amino group i.e. $-NH-$ in the formula (A) or $$\begin{array}{c} R \\ | \\ -N- \end{array}$$

in the formula (B). Otherwise, it is possible to employ a mixture comprising a dye wherein $-SO_2X$ is attached to the p-position to the amino group and a dye wherein $-SO_2X$ is attached to the m-position to the amino group. In such a case, the mixture preferably comprises from 65 to 100% by weight of the dye wherein $-SO_2X$ is attached to the m-position and from 0 to 35% by weight of the dye wherein $-SO_2X$ is attached to the p-position.

In the present invention, the halogen atom includes a chlorine atom, a fluorine atom and a bromine atom.

Among formazan reactive dyes represented by the formula B, particularly preferred is a dye represented in its free acid form by the following formula (B-1) or (B-2):

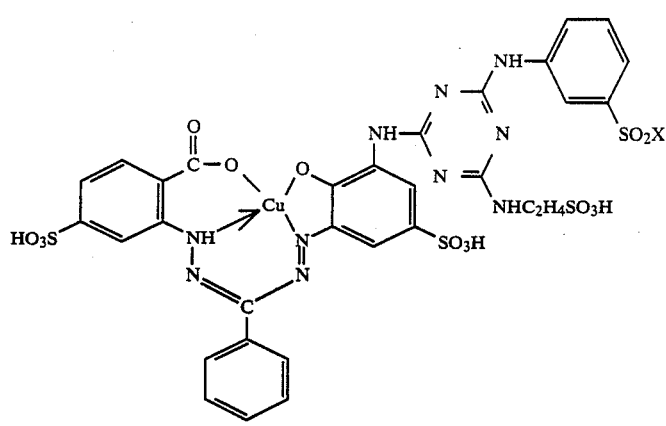

(B-1)

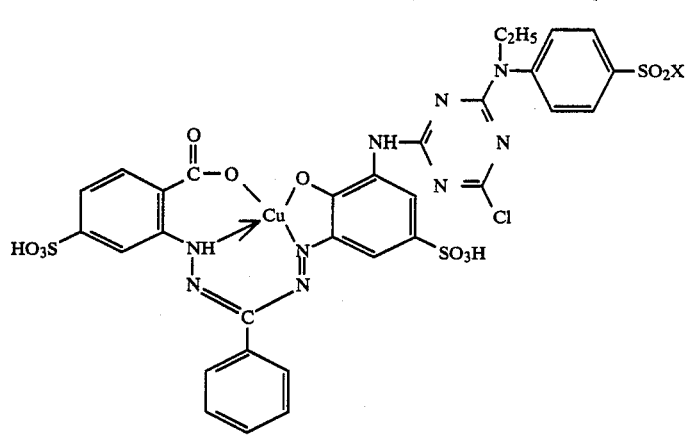

(B-2)

wherein X is as above with respect to the formula (B).

In the present invention, each of the water-soluble reactive dyes is available in the form of its free acid or its salt. As the salt, an alkali metal salt or an alkaline earth metal salt such as a lithium salt, a sodium salt, a potassium salt or a calcium salt is preferred.

The water-soluble reactive dyes represented by the formulas (A) and (B) can be prepared by known methods, and there is no particular restriction as to the methods for their preparation.

In the present invention, it is essential to incorporate the formazan reactive dye of the formula (B) to the anthraquinone reactive dye of the formula (A). The amount of the formazan reactive dye to be incorporated is from 0.2 to 5 times, preferably from 0.4 to 2 times, by weight relative to the anthraquinone reactive dye. If the amount of the formazan reactive dye is too small or too large, it is hardly possible to obtain the effects intended by the present invention. In the present invention, the two reactive dyes may already be mixed or may be mixed at the time of dyeing operation.

As described in the foregoing, the present invention provides a water-soluble dye mixture of blue dyes of the formulas (A) and (B). When the water-soluble dye mixture of the present invention is actually used, a yellow component and/or a red component may be incorporated, as the case requires, in order to obtain a desired color. There is no particular restriction as to such yellow and red components. However, it is particularly preferred to use as the yellow component a reactive dye represented in its free acid form by the formula (I) or (II):

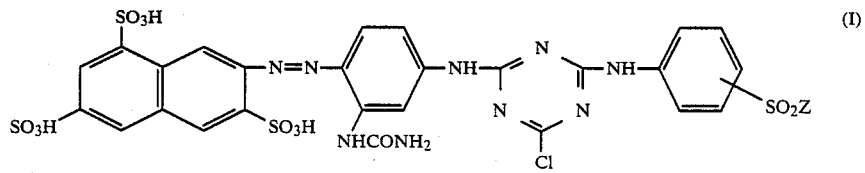

(I)

wherein Z is —CH=CH$_2$ or —C$_2$H$_4$OSO$_3$H,

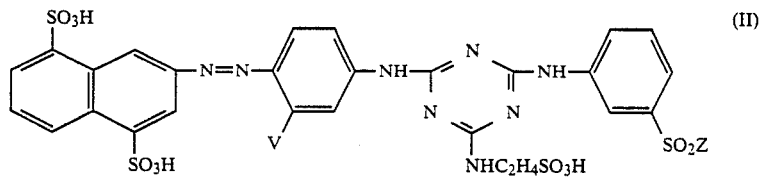

wherein V is —NHCONH₂ or —NHCOCH₃, and Z is —CH=CH₂ or —C₂H₄OSO₃H, and as the red component a reactive dye represented in its free acid from by the formula (III):

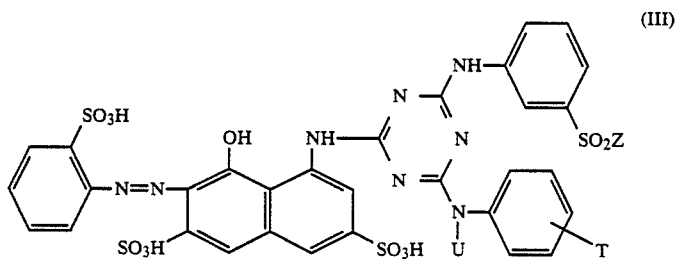

wherein U is a hydrogen atom, a methyl group or an ethyl group, T is a hydrogen atom, a chlorine atom or a bromine atom, and Z is —CH=CH₂ or —C₂H₄OSO₃H, whereby the dyeing rates of the respective dyes agree to one another, and the reproducibility of dyeing will be good.

Fibers which may be dyed by the dye mixture of the present invention include cellulose fibers such as cotton, viscose rayon, cuprammonium rayon and hemp, and nitrogen-containing fibers such as polyamide, wool and silk. Cellulose fibers are particularly preferred. These fibers may be used in combination with e.g. polyester, triacetate or polyacrylonitrile as mixed fibers.

The dye mixture of the present invention may be applied to various conventional dyeing processes. It is particularly suitable for use in an exhaustion dyeing process. However, it is also effective when used in a cold pad-batch process or a pad-steam process.

The exhaustion dyeing of cellulose-containing fibers with a water-soluble dye mixture of the present invention can be conducted in the presence of alkali such as sodium bicarbonate, sodium carbonate, lithium carbonate or sodium hydroxide and an inorganic salt such as Glauber's salt or sodium chloride. The alkali is used usually in an amount of from 10 to 30 g per liter of the dye bath. The inorganic salt may be used in a large amount of 50 g or more per liter of the dye bath. However, in the present invention, adequate dyeing can be attained with a small amount at a level of from 5 to 40 g/liter. The temperature for dyeing is usually from 40° to 80° C., preferably from 40° to 60° C.

The water-soluble dye mixture of the present invention comprising the specific blue anthraquinone reactive dye and the specific blue formazan reactive dye in the specific proportions is an excellent dye having small temperature dependency and salt concentration dependency and being capable of dyeing clearly even at a low salt concentration without impairing excellent build up properties of the anthraquinone reactive dye.

Now, the present invention will be described in further detail with reference to Examples. However, it should be understood that the present invention is by no means restricted by such specific Examples.

EXAMPLE 1

0.2 g of a dye mixture comprising 40 parts by weight of an anthraquinone reactive dye represented in its free acid form by the formula:

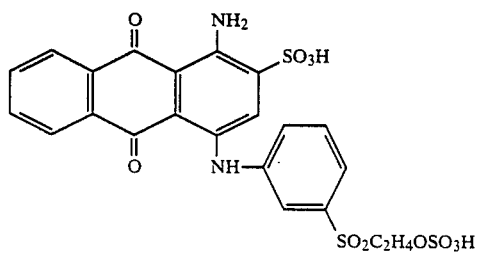

and 60 parts by weight of formazan reactive dye represented in its free acid form by the formula:

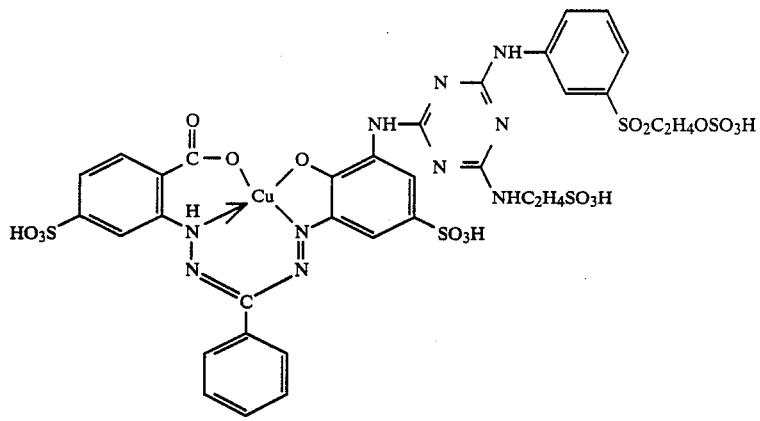

was dissolved in 200 ml of water. To this solution, 10 g of Glauber's salt was added and dissolved to obtain a dye bath (Glauber's salt concentration: 50 g/liter). In this dye bath, 10 g of a non-mercerized cotton knitted fabric was immersed, and the bath was heated to 60° C. over a period of 30 minutes. Then, 3 g of sodium carbonate was added thereto, and exhaustion dyeing was conducted at the same temperature for one hour. After dyeing, the dyed fabric was subjected to washing with water, soaping and drying in accordance with usual methods, to obtain a blue-dyed fabric.

With respect to this dyed fabric, clearness was evaluated, and the degree of exhaustion was obtained from the surface reflectance of the dyed fabric as measured by a color-difference meter (manufactured by Nippon Denshoku Kogyo K.K.).

Further, in order to determine the salt concentration dependency, the temperature dependency and the build up properties of the dye mixture of this Example during the dyeing operation, dyeing was conducted in the same manner as above by changing (1) the Glauber's salt concentration of the dye bath to 10 g/liter, (2) the dyeing temperature to 50° C. or (3) the amount of the dye mixture used to 0.8 g.

On the basis of the respective results, the salt concentration dependency was represented by the percentage of the dyed color density at the Glauber's salt concentration of 10 g/liter to the dyed color density at the Glauber's salt concentration of 50 g/liter.

For the temperature dependency, the dyed color density at a dyeing temperature of 50° C. relative to the dyed color density at a dyeing temperature of 60° C. is obtained, and the temperature dependency was represented by the percentage thereof to the dyed color density in the case of the formazan reactive dye used alone (Comparative Example 2) which is excellent in the temperature dependency.

Further, for the build up properties, the dyed color density when 0.8 g of the dye mixture was used relative to the dyed color density when 0.2 g of the dye mixture was used, was obtained and the build up properties were represented by the percentage thereof to the dyed color density in the case where the anthraquinone reactive dye was used alone (Comparative Example 1) which is excellent in the build up properties.

These results are shown in Table 1.

EXAMPLE 2 and COMPARATIVE EXAMPLES 1 to 2

The tests were conducted in the same manner as in Example 1 except that the proportions of the dyes in the dye mixture were changed as shown in Table 1.

TABLE 1

| | Proportions of dyes in the mixture (by weight) | | | | Salt concentration dependency | Temperature[*1] dependency | |
|---|---|---|---|---|---|---|---|
| | Anthra-quinone dye | Formazan dye | Clearness | Degree of exhaustion (%) | $\left(\dfrac{10\ g/l}{50\ g/l}\right)$ | $\left(\dfrac{50°\ C.}{60°\ C.}\right)$ | Build up[*2] properties |
| Example 1 | 40 | 60 | Good | 73 | 60 | 100 | 105 |
| Example 2 | 50 | 50 | Good | 74 | 57 | 95 | 110 |
| Comparative Example 1 | 100 | 0 | Very good | 74 | 30 | 85 | 100 |
| Comparative Example 2 | 0 | 100 | Slightly inferior | 73 | 80 | 100 | 80 |

[*1] The temperature dependency was represented by a relative value based on the value of Comparative Example 2 being 100.
[*2] The build up properties are represented by a relative value based on the value of Comparative Example 1 being 100.

EXAMPLE 3

The test was conducted in the same manner as in Example 1 except that the formazan reactive dye was changed to the one represented in its free acid form by the following formula:

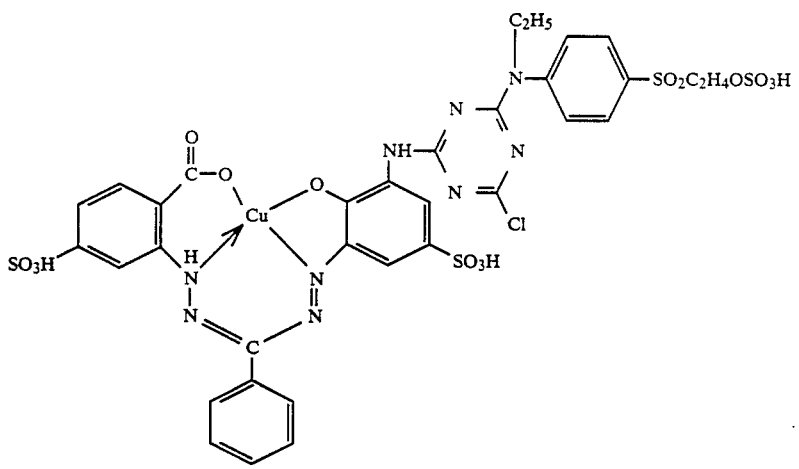

whereby clearness was very good, the degree of exhaustion was 75%, the salt concentration dependency was 61, the temperature dependency was 100, and the build up properties were 110.

EXAMPLE 4

The test was conducted in the same manner as in Example 1 except that the composition of 40 parts by weight of the anthraquinone reactive dye was changed to a mixture comprising 70% by weight of an anthraquinone reactive dye represented in its free acid form by the formula:

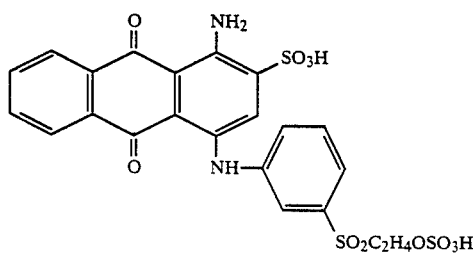

and 30% by weight of an anthraquinone reactive dye represented in its free acid form by the formula:

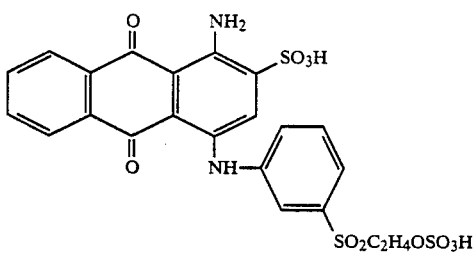

whereby clearness was very good, the degree of exhaustion was 70%, the salt concentration dependency was 58%, the temperature dependency was 98, and the build up properties were 103.

EXAMPLE 5

The tests were conducted in the same manner as in Example 1 except that the formazan reactive dye was changed to formazan reactive dyes disclosed in Table 2 (each represented by the free acid form), whereby clearness was very good, and the salt concentration dependency, temperature dependency and build up properties were good in every case.

TABLE 2

[Structure: Cu-complexed formazan dye with triazine reactive group bearing -NR- aryl-SO₂X substituent and -Y substituent; parent has two SO₃H groups, carboxylate coordinated to Cu, and phenyl group on formazan carbon]

| No. | -Y | R<br>-N- | aryl-SO₂X |
|---|---|---|---|
| 5-1 | -Cl | -NH- | phenyl-SO₂C₂H₄OSO₃H (meta) |
| 5-2 | -Cl | " | " |
| 5-3 | -F | -N(CH₃)- | " |
| 5-4 | -NH-C₆H₄-SO₃H (para) | -NH- | " |
| 5-5 | -F | -N(C₃H₇)- | phenyl-SO₂CH₂H₄OSO₃H (ortho) |
| 5-6 | -Br | -NH- | phenyl-SO₂CH=CH₂ (meta) |

EXAMPLE 6

0.2 g of a dye mixture comprising 50 parts by weight of an anthraquinone reactive dye represented in its free acid form by the formula:

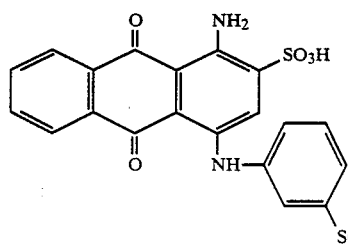

and 50 parts by weight of a formazan reactive dye represented in its free acid form by the formula:

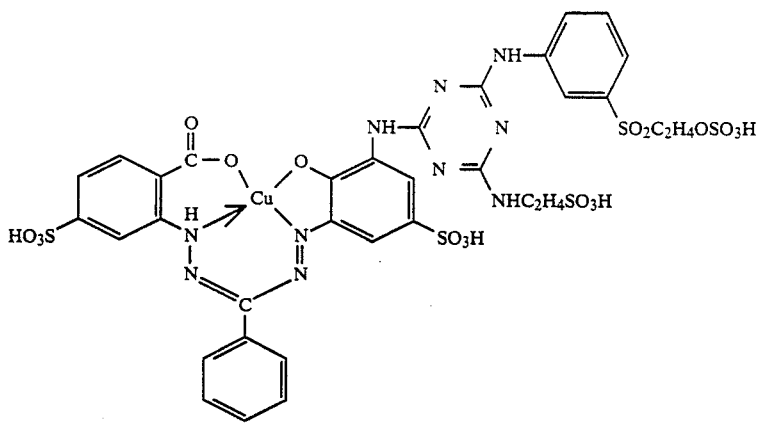

as the blue component, 0.2 g of a monoazo reactive dye represented in its free acid form by the formula:

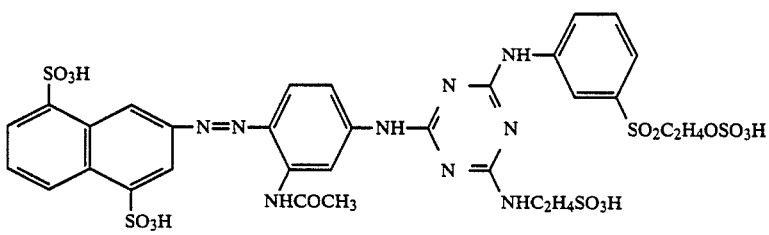

as the yellow component, and 0.2 g of a monoazo reactive dye represented in its free acid form by the formula:

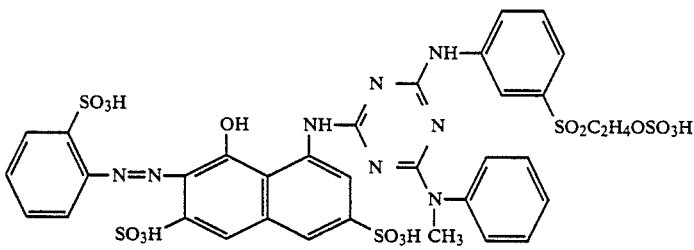

as the red component, were dissolved in 200 ml of water. To this solution, 10 g of Glauber's salt was added and dissolved to obtain a dye bath (Glauber's salt concentration: 50 g/liter). In this dye bath, 10 g of a non-mercerized cotton knitted fabric is immersed, and the bath was heated to 60° C. over a period of 30 minutes. Then, 3 g of sodium carbonate was added thereto, and exhaustion dyeing was conducted at the same temperature for 10 minutes, 20 minutes, 40 minutes or one hour.

After dyeing, the dyed fabric was subjected to washing with water, soaping and drying in accordance with usual methods to obtain a brown-dyed fabric.

The four brown fabrics thus obtained had similar hue, and it was found that the dyeing rates of the yellow reactive dye, the red reactive dye and the blue reactive dye were constant and uniform, and their combination is particularly excellent in the reproducibility.

EXAMPLE 7

The tests were conducted in the same manner as in Example 6 except that the blue component was changed to a dye mixture comprising 50 parts by weight of an anthraquinone reactive dye represented in its free acid form by the formula:

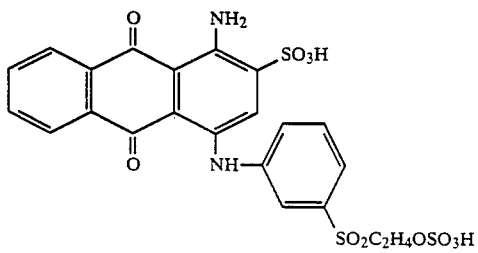

and 50 parts by weight of a formazan reactive dye represented in its free acid form by the formula:

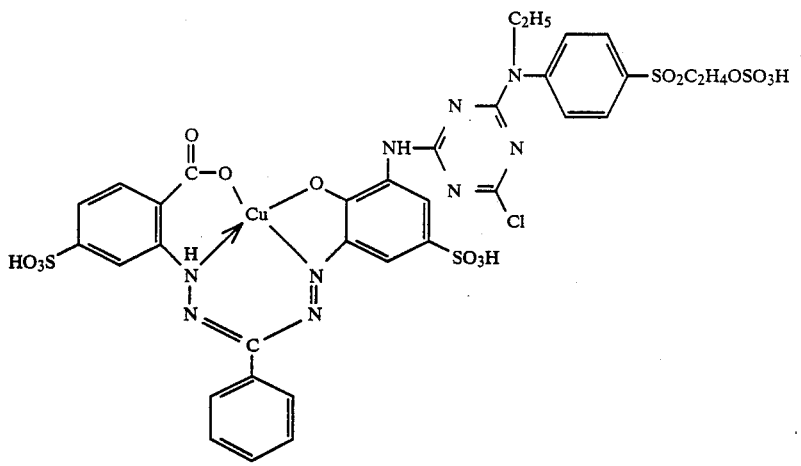

the yellow component was changed to a monoazo reactive dye represented in its free acid form by the formula:

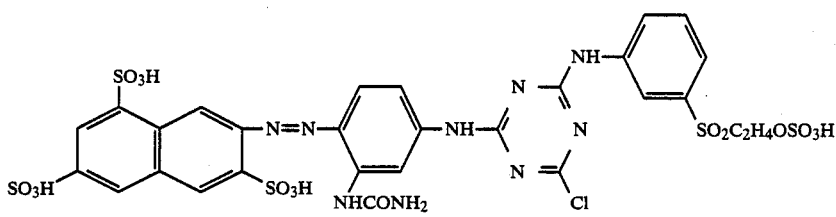

and the red component was changed to a monoazo reactive dye represented in its free acid form by the formula:

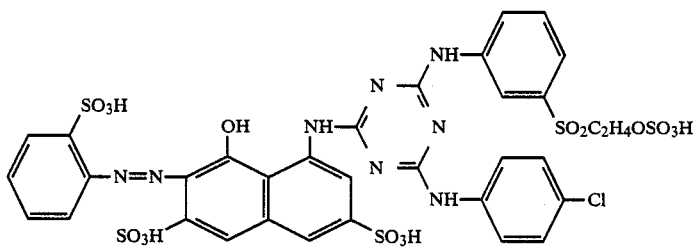

whereby the dyeing rates of the blue, yellow and red dyes were constant and uniform.

We claim:

1. A water-soluble dye mixture comprising a blue anthraquinone reactive dye represented in its free acid form by the formula:

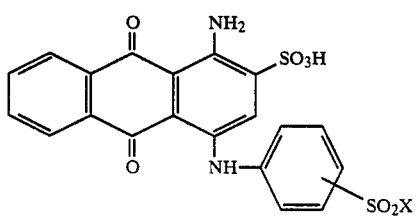
(A)

wherein X is —CH=CH$_2$ or —C$_2$H$_4$W wherein W is a group removable by action of alkali and from 0.2 to 5 times by weight to said anthraquinone reactive dye of a blue formazan reactive dye represented in its free acid form by the formula:

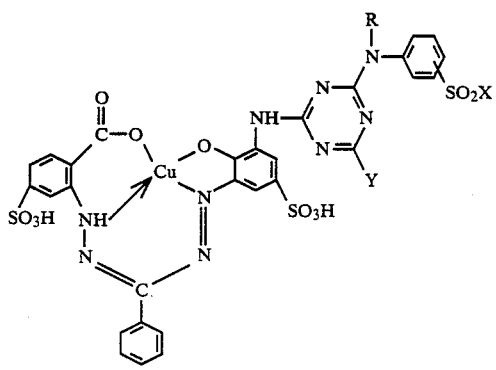
(B)

wherein R is a hydrogen atom or a C$_1$-C$_4$ alkyl group, Y is a halogen atom, —NHC$_2$H$_4$SO$_3$H or

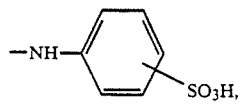

and X is —CH=CH$_2$ or —C$_2$H$_4$W wherein W is a group removable by action of alkali.

2. The water-soluble dye mixture according to claim 1, wherein the anthraquinone reactive dye is a dye of the formula (A) wherein —SO$_2$X is attached to the p- or m-position to —NH—.

3. The water-soluble dye mixture according to claim 1, wherein the anthraquinone reactive dye is a mixture comprising from 65 to 100% by weight of a dye of the formula (A) wherein —SO$_2$X is attached to the m-position to —NH— and from 0 to 35% by weight of a dye of the formula (A) wherein —SO$_2$X is attached to the p-position to —NH—.

4. The water-soluble dye mixture according to claim 1, wherein the formazan reactive dye is a dye of the formula (B) wherein Y is a halogen atom or —NHC$_2$H$_4$SO$_3$H.

5. The water-soluble dye mixture according to claim 1, wherein the formazan reactive dye is a dye of the formula (B) wherein —SO$_2$X is attached to the p- or m-position to

6. The water-soluble dye mixture according to claim 1, wherein the formazan reactive dye is a dye represented in its free acid form by the formula:

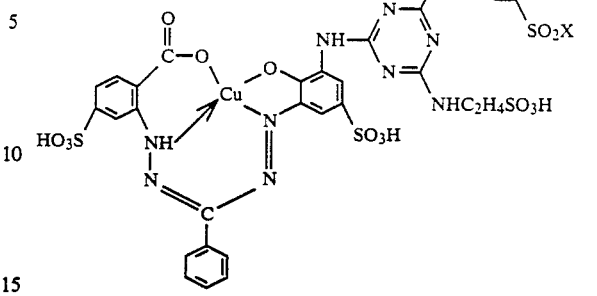

wherein X is as defined in claim 1.

7. The water-soluble dye mixture according to claim 1, wherein the formazan reactive dye is a dye represented in its free acid form by the formula:

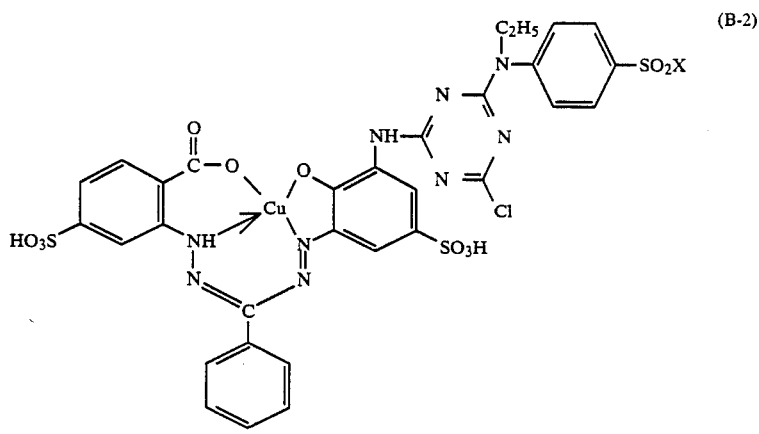

wherein X is as defined in claim 1.

8. The water-soluble dye mixture according to claim 1, wherein the formazan reactive dye is in an amount of from 0.4 to 2 times by weight to the anthraquinone reactive dye.

9. The water-soluble dye mixture according to claim 1, wherein the anthraquinone reactive dye is a dye of the formula (A) wherein —SO$_2$X is attached to the p- or m-position to —NH— or a mixture comprising from 65 to 100% by weight of a dye of the formula (A) wherein —SO$_2$X is attached to the m-position to —NH— and from 0 to 35% by weight of a dye of the formula (A) wherein —SO$_2$X is attached to the p-position to —NH—, and the formazan reactive dye is a dye represented in its free acid form by the following formula (B-1) or (B-2):

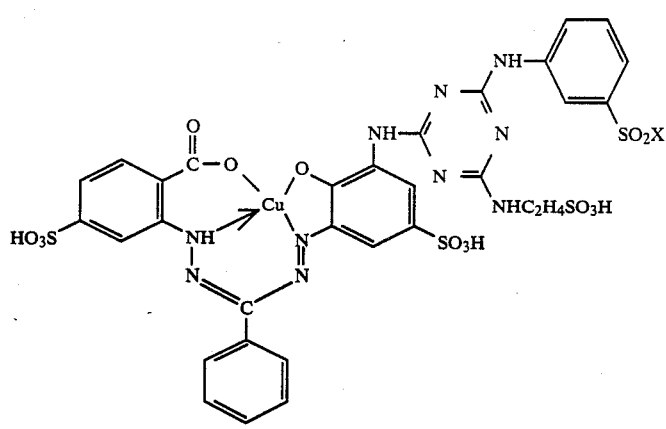
(B-1)

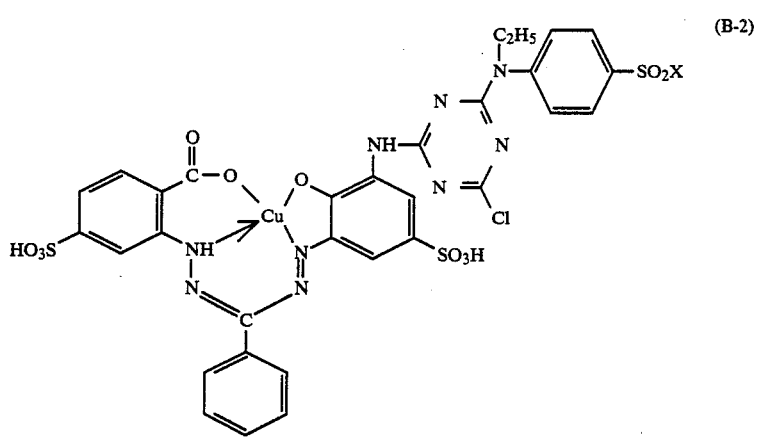
(B-2)

wherein X is as defined in claim 1, and the formazan reactive dye is in an amount of from 0.4 to 2 times by weight to the anthraquinone reactive dye.

10. The water-soluble dye mixture according to claim 1, which is a dye for exhaustion dyeing of cellulose fibers.

11. The water-soluble dye mixture according to claim 1, which contains, in addition to the anthraquinone reactive dye and the formazan reactive dye, a yellow reactive dye represented in its free acid form by the following formula (I) or (II):

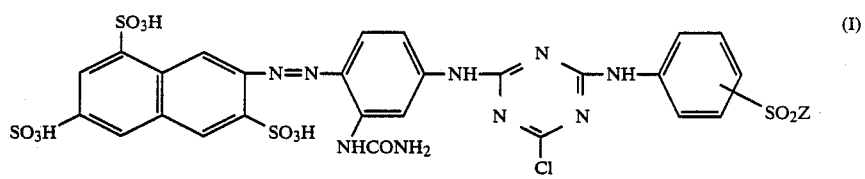
(I)

wherein Z is —CH=CH$_2$ or —C$_2$H$_4$OSO$_3$H,

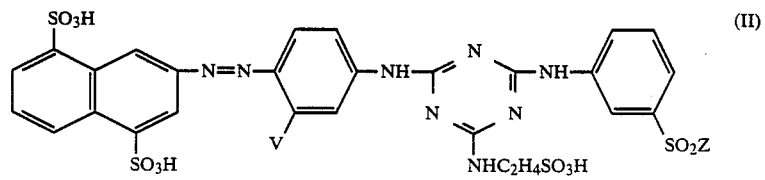
(II)

wherein V is —NHCONH$_2$ or —NHCOCH$_3$, and Z is as defined above, and/or a red reactive dye represented in its free acid form by the following formula (III):

(III)

[Structure III]

wherein U is a hydrogen atom, a methyl group or an ethyl group, T is a hydrogen atom, a chlorine atom or a bromine atom, and Z is as defined above.

12. A method for dyeing cellulose and/or nitrogen-containing fiber, wherein a water-soluble dye mixture comprising a blue anthraquinone reactive dye represented in its free acid form by the formula:

[Structure A]

wherein X is —CH=CH$_2$ or —C$_2$H$_4$W wherein W is a group removable by action of alkali and from 0.2 to 5 times by weight to said anthraquinone reactive dye of a blue formazan reactive dye represented in its free acid form by the formula:

[Structure B]

wherein R is a hydrogen atom or a C$_1$–C$_4$ alkyl group, Y is a halogen atom, —NHC$_2$H$_4$SO$_3$H or

[Structure: —NH—phenyl—SO$_3$H]

and X is —CH=CH$_2$ or —C$_2$H$_4$W wherein W is a group removable by action of alkali, is used.

* * * * *